(12) United States Patent
Watanabe

(10) Patent No.: US 11,423,230 B2
(45) Date of Patent: Aug. 23, 2022

(54) PROCESS EXTRACTION APPARATUS AND NON-TRANSITORY COMPUTER READABLE MEDIUM

(71) Applicant: FUJIFILM Business Innovation Corp., Tokyo (JP)

(72) Inventor: Takehito Watanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 412 days.

(21) Appl. No.: 16/548,806

(22) Filed: Aug. 22, 2019

(65) Prior Publication Data
US 2020/0302022 A1 Sep. 24, 2020

(30) Foreign Application Priority Data

Mar. 20, 2019 (JP) .............................. JP2019-052379

(51) Int. Cl.
| | | |
|---|---|---|
| G06F 15/16 | (2006.01) | |
| G06F 40/30 | (2020.01) | |
| H04L 51/08 | (2022.01) | |
| G06F 40/279 | (2020.01) | |
| G06Q 10/10 | (2012.01) | |
| G06F 40/194 | (2020.01) | |
| H04L 51/00 | (2022.01) | |
| H04L 41/00 | (2022.01) | |

(52) U.S. Cl.
CPC ............ *G06F 40/30* (2020.01); *G06F 40/194* (2020.01); *G06F 40/279* (2020.01); *G06Q 10/10* (2013.01); *G06Q 10/107* (2013.01); *H04L 51/08* (2013.01); *H04L 51/16* (2013.01); *H04L 41/24* (2013.01)

(58) Field of Classification Search
CPC ...... G06F 40/30; G06F 40/194; G06F 40/279; G06Q 10/10; G06Q 10/107; H04L 51/08; H04L 51/16; H04L 41/24
USPC .......................................................... 704/9
See application file for complete search history.

(56) References Cited

U.S. PATENT DOCUMENTS

| | | | | |
|---|---|---|---|---|
| 5,774,525 A | * | 6/1998 | Kanevsky | G06F 21/31 713/182 |
| 5,815,830 A | * | 9/1998 | Anthony | G06F 16/90344 707/916 |
| 6,006,175 A | * | 12/1999 | Holzrichter | A61B 5/0507 704/E15.041 |
| 6,016,476 A | * | 1/2000 | Maes | G06Q 20/341 705/26.1 |

(Continued)

FOREIGN PATENT DOCUMENTS

| | | |
|---|---|---|
| JP | 2004362043 | 12/2004 |
| JP | 5958472 | 8/2016 |
| JP | 2018-045326 | 3/2018 |

*Primary Examiner* — Alicia Baturay
(74) *Attorney, Agent, or Firm* — JCIPRNET

(57) ABSTRACT

A process extraction apparatus includes a process extraction apparatus including a message group creator that, based on keywords each extracted from a respective one of multiple messages posted, the respective posting times of the multiple messages, and the respective posters of the multiple of messages, groups the multiple of messages into multiple message groups each including messages with similar characteristics, and an output unit that, based on the respective posting times of the messages included in each of the multiple message groups, outputs a precedence relationship between the multiple message groups.

18 Claims, 17 Drawing Sheets

(56) References Cited

U.S. PATENT DOCUMENTS

| | | | | |
|---|---|---|---|---|
| 6,034,970 | A * | 3/2000 | Levac | H04L 63/102 370/466 |
| 6,104,989 | A * | 8/2000 | Kanevsky | G06F 40/216 704/7 |
| 6,212,548 | B1 * | 4/2001 | DeSimone | H04L 12/1813 719/329 |
| 6,233,570 | B1 * | 5/2001 | Horvitz | G06N 5/00 707/999.102 |
| 6,393,460 | B1 * | 5/2002 | Gruen | G06Q 10/107 709/204 |
| 6,421,453 | B1 * | 7/2002 | Kanevsky | G06F 21/316 340/5.2 |
| 6,484,196 | B1 * | 11/2002 | Maurille | H04L 51/04 370/260 |
| 6,490,548 | B1 * | 12/2002 | Engel | G06F 40/242 707/999.1 |
| 6,557,027 | B1 * | 4/2003 | Cragun | H04L 51/04 719/329 |
| 6,574,624 | B1 * | 6/2003 | Johnson | G06F 16/3322 707/999.005 |
| 6,584,181 | B1 * | 6/2003 | Aktas | H04M 3/53333 379/88.04 |
| 6,603,921 | B1 * | 8/2003 | Kanevsky | H04N 9/8042 386/253 |
| 6,606,644 | B1 * | 8/2003 | Ford | H04L 69/22 707/999.102 |
| 6,629,087 | B1 * | 9/2003 | Benson | G06F 40/35 706/11 |
| 6,668,169 | B2 * | 12/2003 | Burgan | H04L 12/1827 455/418 |
| 6,678,698 | B2 * | 1/2004 | Fredell | G06Q 10/06 707/999.01 |
| 6,792,448 | B1 * | 9/2004 | Smith | H04L 67/36 709/204 |
| 6,907,447 | B1 * | 6/2005 | Cooperman | H04L 51/04 715/752 |
| 7,039,677 | B2 * | 5/2006 | Fitzpatrick | H04L 12/1827 709/204 |
| 7,107,285 | B2 * | 9/2006 | von Kaenel | G06F 16/29 |
| 7,257,768 | B2 | 8/2007 | Horikiri et al. | |
| 7,475,110 | B2 * | 1/2009 | Kirkland | H04L 51/16 709/204 |
| 8,190,999 | B2 * | 5/2012 | Chen | G06Q 10/107 715/753 |
| 8,418,069 | B2 * | 4/2013 | Wanderski | G06Q 10/00 715/842 |
| 8,762,475 | B2 * | 6/2014 | Cheung | H04L 51/04 709/207 |
| 9,002,949 | B2 * | 4/2015 | Appleman | H04L 51/04 709/206 |
| 9,043,418 | B2 * | 5/2015 | Appelman | H04L 51/04 709/206 |
| 9,083,661 | B2 * | 7/2015 | Appelman | H04L 29/06 |
| 9,100,221 | B2 * | 8/2015 | Appelman | H04L 51/046 |
| 10,268,340 | B2 * | 4/2019 | Chen | G06Q 10/107 |
| 2002/0099775 | A1 * | 7/2002 | Gupta | H04L 51/22 709/205 |
| 2002/0099777 | A1 * | 7/2002 | Gupta | G06Q 10/107 709/206 |
| 2002/0152117 | A1 * | 10/2002 | Cristofalo | H04N 21/812 348/E7.071 |
| 2002/0154172 | A1 * | 10/2002 | Linsey | G06F 16/954 715/804 |
| 2003/0023684 | A1 * | 1/2003 | Brown | H04L 12/1827 715/752 |
| 2003/0120720 | A1 * | 6/2003 | Montero | H04L 51/14 709/215 |
| 2003/0126089 | A1 * | 7/2003 | Fukuoka | G06N 5/04 705/54 |
| 2003/0131055 | A1 * | 7/2003 | Yashchin | G06Q 10/107 715/744 |
| 2004/0078435 | A1 * | 4/2004 | Dunbar | H04L 51/04 709/206 |
| 2005/0149620 | A1 * | 7/2005 | Kirkland | H04L 51/04 709/204 |
| 2005/0235034 | A1 * | 10/2005 | Chen | H04L 51/04 707/999.002 |
| 2014/0101162 | A1 * | 4/2014 | Hsueh | G06F 16/313 707/739 |
| 2014/0289022 | A1 | 9/2014 | Kamiya et al. | |

\* cited by examiner

FIG. 8

| N... | LABE... | NEW... | TITLE | CREATED BY | LAST MODIFIED ON | OPERATION |
|---|---|---|---|---|---|---|
| 54 | | | RE[2]: MR./MS. ▓ DRAFT OF EXTERNAL COLLABORATION PROTO-FUNCTION SPECS DOCUMENT | | 11/14/2018 15:04 | |
| | | | INTEGRATION-PROTO-COMMENTS.XDW (28 KB) (33%) | | | |
| 55 | | | RE[3]: <DEPLOYMENT> HOW TO PROCEED WITH TECHNOLOGY DEVELOPMENT (11/13) | | 11/14/2018 14:40 | |
| 56 | | | RE: MR./MS. ▓ DRAFT OF EXTERNAL COLLABORATION PROTO-FUNCTION SPECS DOCUMENT | | 11/14/2018 14:12 | |
| 57 | | | RE: <DEPLOYMENT> HOW TO PROCEED WITH TECHNOLOGY DEVELOPMENT (11/13) | | 11/14/2018 10:08 | |
| | | | DEMO SCENARIO.TXT (1 KB) (11%) | | | |
| | | | -INTEGRATION-PROTO.MD (3 KB) (11%) | | | |
| 58 | | | RE[2]: <DEPLOYMENT> HOW TO PROCEED WITH TECHNOLOGY DEVELOPMENT (11/13) | | 11/14/2018 09:39 | |
| | | | NOTIFICATION PRIORITY.XLSX (12 KB) (11%) | | | |
| 59 | | | RE: <DEPLOYMENT> HOW TO PROCEED WITH TECHNOLOGY DEVELOPMENT (11/13) | | 11/14/2018 08:59 | |
| 60 | | | <DEPLOYMENT> HOW TO PROCEED WITH TECHNOLOGY DEVELOPMENT (11/13) | | 11/13/2018 20:53 | |
| 61 | | | DB FOR PERFORMANCE VERIFICATION, EOR VERSION INFORMATION, AND MODULE DEPLOYMENT ... | | 11/13/2018 18:51 | |
| 62 | | | RE[2]: MR./MS. ▓ MR./MS. ▓ FOR DB FEE ESTIMATES ... | | 11/13/2018 16:05 | |
| 63 | | | COLLABORATION FUNCTION RESEARCH | | 11/13/2018 15:08 | |
| | | | COLLABORATION.PPTX (1345 KB) (44%) | | | |
| 64 | | | RE: MR./MS. ▓ DRAFT OF EXTERNAL COLLABORATION PROTO-FUNCTION SPECS DOCUMENT | | 11/13/2018 14:15 | |
| | | | SCREEN DESIGN DOCUMENT.ZIP (548 KB) (11%) | | | |
| 65 | | | RE[2]: 11/12 COLLABORATION FULL-TEXT SEARCH REVIEW MEETING'S MINUTES | | 11/12/2018 17:10 | |
| 66 | | | MR./MS. ▓ DRAFT OF EXTERNAL COLLABORATION PROTO-FUNCTION SPECS DOCUMENT | | 11/12/2018 17:01 | |
| | | | -INTEGRATION-PROTO.MD (2 KB) (22%) | | | |
| 67 | | | RE: 11/12 COLLABORATION FULL-TEXT SEARCH REVIEW MEETING'S MINUTES | | 11/12/2018 16:32 | |
| 68 | | | 11/12 COLLABORATION FULL-TEXT SEARCH REVIEW MEETING'S MINUTES | | 11/12/2018 16:30 | |
| | | | COLLABORATION FULL-TEXT SEARCH REVIEW | | | |
| 69 | | | REVIEW OF FYI: ELASTIC SEARCH | | 11/12/2018 08:48 | |

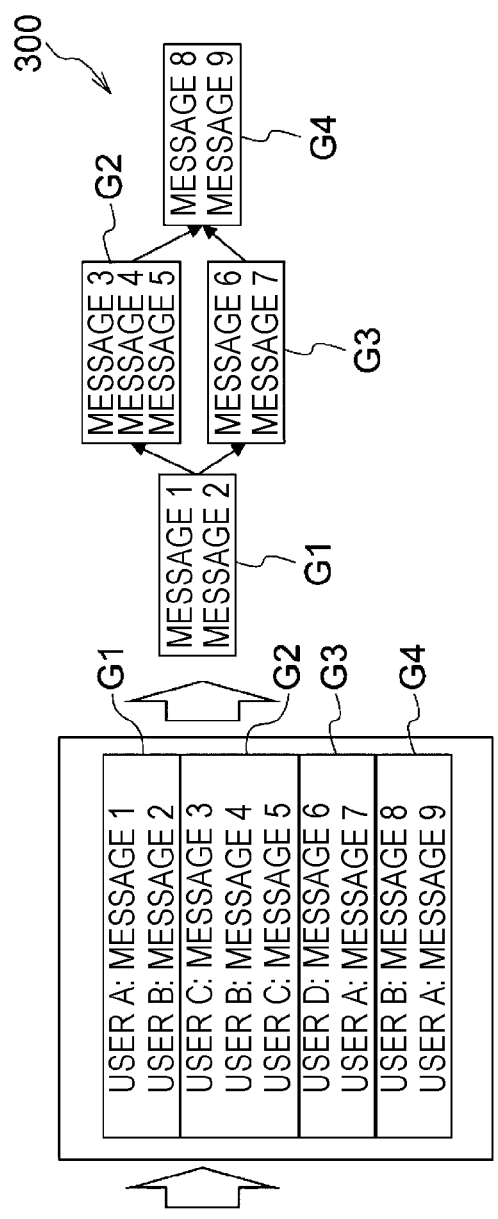

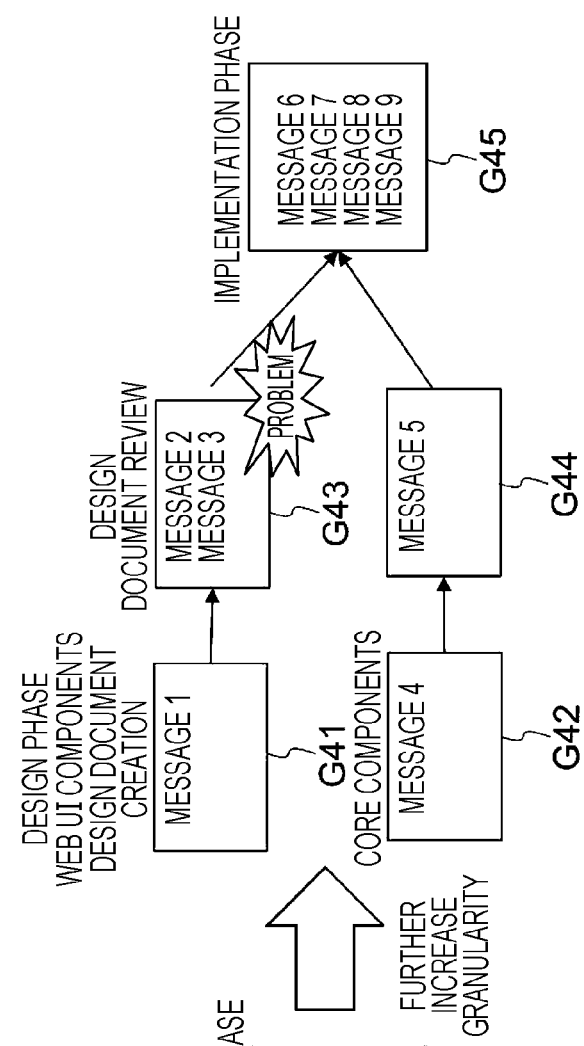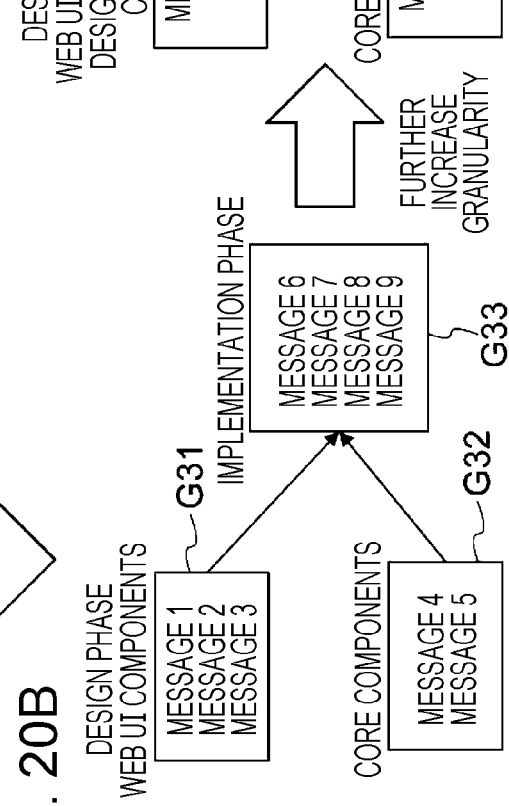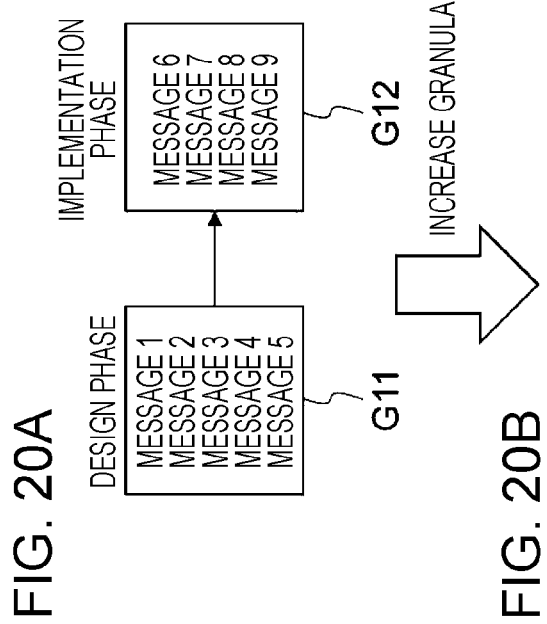

PROCESS EXTRACTION APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-052379 filed Mar. 20, 2019.

BACKGROUND

(i) Technical Field

The present disclosure relates to a process extraction apparatus, and a non-transitory computer readable medium.

(ii) Related Art

Japanese Unexamined Patent Application Publication No. 2018-045326 discloses a record dividing apparatus including an acquirer, a memory, and a divider. The acquirer acquires a message record including a time-series arrangement of multiple messages transmitted and received between multiple users via an electrical communication line. The memory stores an operation history, which is a history of user operations made on an apparatus connected to the electrical communication line. The divider divides the message record based on a common operation, which is an operation stored in the operation history, executed at the time when the multiple messages included in the message record are transmitted and received, and common to at least two or more users.

Japanese Patent No. 5958472 discloses a task support apparatus including a basic behavior information acquirer, a task behavior information assigning unit, a task flow calculator, an expected task flow acquirer, a task flow difference detector, and an output unit. The basic behavior information acquirer acquires basic behavior information, which is indicative of the behavior of each member of interest and includes attribute information associated with the behavior. The task behavior information assigning unit assigns, to the basic behavior information, task behavior information indicative of preset behavior classification. The task flow calculator calculates a task flow associated with the task behavior information, based on the attribute information included in the basic behavior information to which the task behavior information has been assigned. The expected task flow acquirer acquires an expected task flow, which is indicative of a task flow that is to be followed by the member. The task flow difference detector detects the difference between the task flow calculated by the task flow calculator and the expected task flow acquired by the expected task flow acquirer. The output unit outputs presentation information indicative of the difference between the task flow and the expected task flow.

Japanese Unexamined Patent Application Publication No. 2004-362043 discloses a project management system including a recording system, a collector, and an image generator. The recording system records, for each project involving multiple users, communication history information, document history information, and access history information such that these pieces of information are distinguished from each other. The communication history information includes information for identifying the time of occurrence of communication between users involved in the project. The document history information includes information for identifying the time of occurrence of an operation associated with a document related to the project. The access history information includes information for identifying the time of occurrence of access to a document or communication message that is related to the project. The collector collects, from the recording system, records related to a project of interest. The image generator generates, based on the records collected by the collector, an image that shows, in relation to a time series, the respective recording frequencies of the communication history information, document history information, and access history information. The generated image is presented to the user.

So-called chat communication tools exist that allow users to communicate by posting messages. Such tools enable a variety of users to post a variety of messages. Accordingly, techniques also exist that group multiple messages that are related in terms of topic or other characteristics.

The above-mentioned tools are increasingly used also in business scenes. For instance, a user reports on the progress of a project, a problem in the project, or other information by posting a message related to the project. By using chat communication tools in business as described above, multiple related messages for a project can be grouped into message groups.

Unfortunately, there is no mutual relevance between such message groups, and therefore such message groups are not recognized as a process in the project.

SUMMARY

Aspects of non-limiting embodiments of the present disclosure relate to a process extraction apparatus that makes it possible to recognize, as a process in a project, message groups into which messages posted via a chat communication tool are grouped.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a process extraction apparatus including a message group creator that, based on keywords each extracted from a respective one of multiple messages posted, the respective posting times of the multiple messages, and the respective posters of the multiple of messages, groups the multiple of messages into multiple message groups each including messages with similar characteristics, and an output unit that, based on the respective posting times of the messages included in each of the multiple message groups, outputs a precedence relationship between the multiple message groups.

BRIEF DESCRIPTION OF THE DRAWINGS

Exemplary embodiment of the present disclosure will be described in detail based on the following figures, wherein:

FIG. 8 illustrates an exemplary display of the user terminal on which multiple messages and attached documents are displayed;

FIG. 9A illustrates exemplary acquisition, at the server, of multiple messages;

FIG. 9B illustrates exemplary grouping, at the server, of the messages into multiple message groups;

FIG. 9C illustrates exemplary creation, at the server, of a precedence relationship between the multiple message groups;

FIGS. 20A to 20C illustrate an example of how a problem within a process of multiple message groups is identified by adjusting the granularity of message groups to finer level.

DETAILED DESCRIPTION

Figure 1:
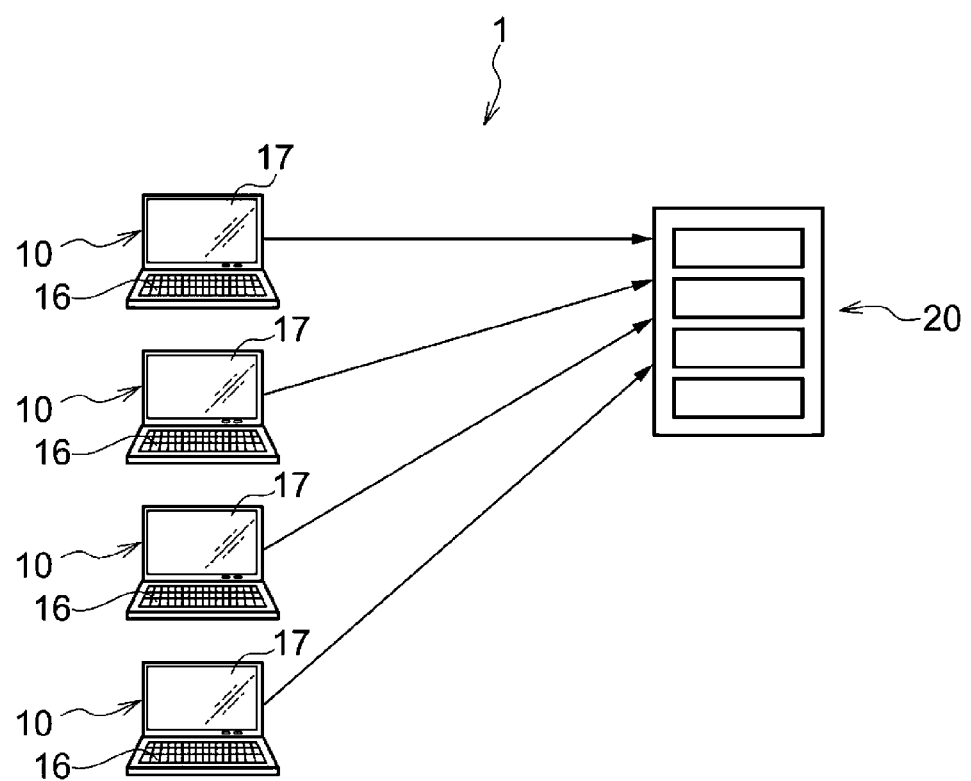
FIG. 1 illustrates a schematic configuration of a process extraction apparatus according to an exemplary embodiment.

An exemplary embodiment of the present disclosure will be described below with reference to the drawings. In the drawings, identical or equivalent components will be denoted by identical reference signs. The relative dimensions in the drawings are exaggerated for ease of illustration and may not be to scale in some cases.

FIG. 1 illustrates a schematic configuration of a process extraction apparatus according to an exemplary embodiment.

As illustrated in FIG. 1, a process extraction apparatus 1 includes multiple user terminals 10 used by individual users, and a server 20.

In the process extraction apparatus 1, for example, the user terminals 10 and the server 20 are connected via the Internet or via a wired or wireless network. FIG. 1 depicts, as the process extraction apparatus 1, an exemplary apparatus in which the above-mentioned components are connected via a wired network. The number of user terminals 10 is not particularly limited.

The user terminal 10 is implemented by a computer apparatus such as a desktop computer, a notebook computer, or a tablet computer. The user terminal 10 is an apparatus that performs processes such as creation and management of a message posted by a user, and creation and management of a document attached to the message. The user terminal 10 performs processes such as management of multiple messages received from other users, and management of documents attached to the messages. The user terminal 10 also manages information such as the respective posting times of multiple messages and the respective posters (users in the exemplary embodiment) of the multiple messages.

The user terminal 10 includes an input unit 16, and a display 17. With the user terminal 10, for example, a message and a document are created by use of the input unit 16, and an image based on the message and the document is displayed on the display 17. The specific configuration and operation of the user terminal 10 will be described later.

The server 20 is implemented by a computer apparatus. The server 20 includes a function that, for a service provided for use by multiple users, processes messages exchanged between users. The term "service provided for use by multiple users" as used herein refers to a so-called chat communication service.

The server 20 performs processes such as management of messages posted by multiple users, and management of documents attached to the messages. Further, the server 20 manages information such as the respective posting times of multiple messages and the respective posters (users in the exemplary embodiment) of the multiple messages.

The server 20 performs, for example, a process of grouping multiple messages into message groups each including messages with similar characteristics. Further, the server 20 performs, for example, a process of outputting a precedence relationship between multiple message groups as a process. The specific configuration and operation of the server 20 will be described later.

Figure 2:
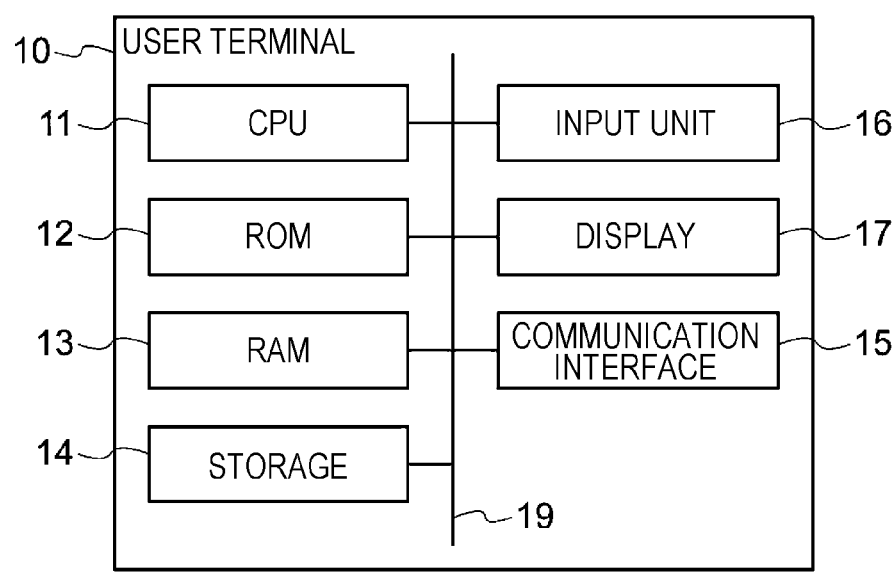
FIG. 2 is a block diagram illustrating the hardware configuration of a user terminal.

FIG. 2 is a block diagram illustrating the hardware configuration of the user terminal 10.

As illustrated in FIG. 2, the user terminal 10 includes a central processing unit (CPU) 11, a read only memory (ROM) 12, a random access memory (RAM) 13, a storage 14, a communication interface 15, the input unit 16, and the display 17. These components are interconnected via a bus 19 in a manner that allows their communication with each other.

The CPU 11, which is a central processing unit, performs processes such as execution of various programs and control of various components. That is, the CPU 11 reads a program from the ROM 12 or the storage 14, and executes the program with the RAM 13 used as a work area. In accordance with the program stored in the ROM 12 or the storage 14, the CPU 11 controls the various components mentioned above and performs various arithmetic processing. In the exemplary embodiment, a message-group-granularity alteration program is stored in the ROM 12 or the storage 14.

The ROM 12 stores various programs and various data. The RAM 13 serves as a work area to temporarily store a program or data. The storage 14, which is implemented as a hard disk drive (HDD) or a solid state drive (SSD), stores various programs including an operating system, and various data.

The communication interface 15 is an interface used for communication with another apparatus or device such as the server 20. For example, a standard such as Ethernet (registered trademark), FDDI, or Wi-Fi (registered trademark) is employed.

The input unit 16 includes a pointing device such as a mouse, and a keyboard. The input unit 16 is used to make various inputs.

The display 17 is, for example, a liquid crystal display, and displays various information. The display 17 may employ a touch screen system such that the display 17 doubles as the input unit 16.

Figure 3:
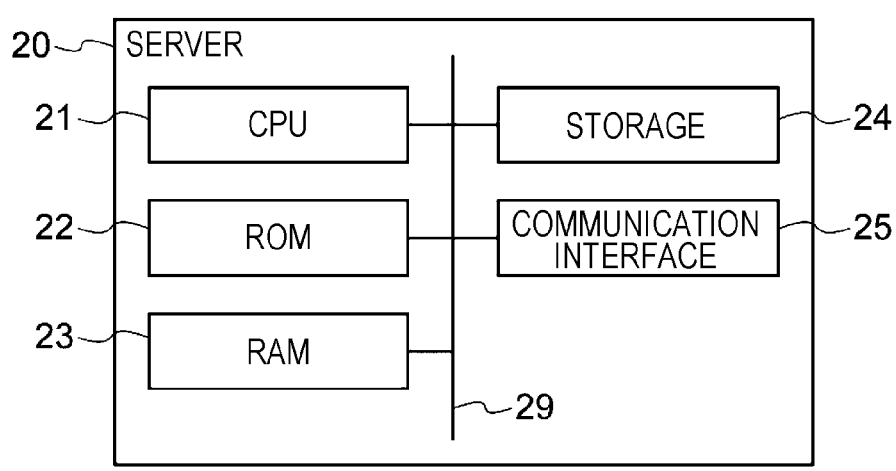
FIG. 3 is a block diagram illustrating the hardware configuration of a server.

FIG. 3 is a block diagram illustrating the hardware configuration of the server 20.

As illustrated in FIG. 3, the server 20 includes a CPU 21, a ROM 22, a RAM 23, a storage 24, and a communication interface 25. These components are interconnected via a bus 29 in a manner that allows their communication with each other.

The CPU 21, which is a central processing unit, performs processes such as execution of various programs and control of various units. That is, the CPU 21 reads a program from the ROM 22 or the storage 24, and executes the program with the RAM 23 used as a work area. In accordance with the program stored in the ROM 22 or the storage 24, the CPU 21 controls the various components mentioned above and performs various arithmetic processing. In the exemplary embodiment, a message group creation program, a precedence relationship output program, a similarity calculation program, and a summary information creation program are stored in the ROM 22 or the storage 24.

The ROM 22 stores various programs and various data. The RAM 23 serves as a work area to temporarily store a program or data. The storage 24, which is implemented as a hard disk drive (HDD) or a solid state drive (SSD), stores various programs including an operating system, and various data.

The communication interface 25 is an interface used for communication with other apparatuses or devices such as the user terminals 10. For example, a standard such as Ethernet (registered trademark), FDDI, or Wi-Fi (registered trademark) is employed.

The following describes the respective functional configurations of the user terminal 10 and the server 20.

Figure 4:
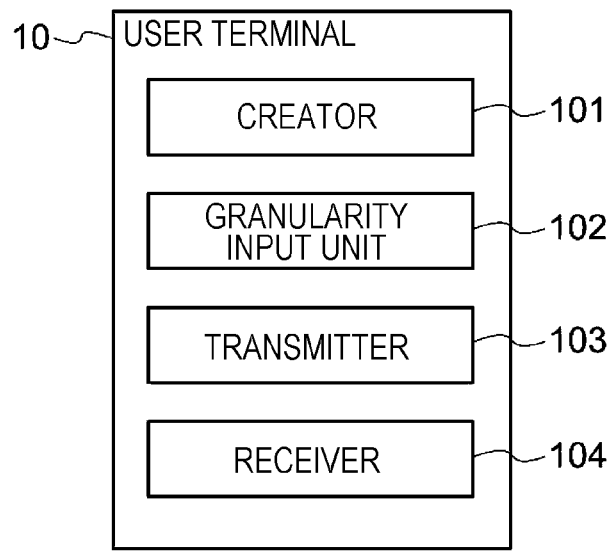
FIG. 4 is a block diagram illustrating an exemplary functional configuration of the user terminal.

FIG. 4 is a block diagram illustrating an exemplary functional configuration of the user terminal 10.

As illustrated in FIG. 4, the user terminal 10 includes, as its functional components, a creator 101, a granularity input unit 102, which represents an example of an input unit, a transmitter 103, and a receiver 104. Each functional component is implemented by the CPU 11 reading the message-group-granularity alteration program stored in the ROM 12 or the storage 14, loading the program into the RAM 13, and executing the program.

The creator 101 creates information such as a message and a document attached to the message. The user creates information such as a message or a document by, for example, inputting data by use of the input unit 16 of the user terminal 10. Alternatively, the user may create information such as a message or a document by, for example, using data received from another apparatus or device via the communication interface 15 of the user terminal 10.

The granularity input unit 102 receives input of alteration information for altering the granularity of multiple message groups into which messages are grouped. The granularity input unit 102 represents an exemplary input unit. More specifically, alteration information, which is information for altering the granularity of multiple message groups into which to group messages, is input by operating a granularity alteration input bar 110 (see FIG. 17 or other figures) described later that is displayed on the display 17.

The term "granularity" as used herein refers to the degree of fineness with which multiple messages are grouped into multiple message groups by altering the number of groups into which to classify the messages. A coarse "granularity" means that multiple messages are grouped into a small number of coarsely classified message groups. A fine "granularity" means that multiple messages are grouped into a large number of finely classified message groups.

The transmitter 103 transmits a message created by the creator 101 to the server 20. The transmitter 103 also attaches a document created by the creator 101 to a message for transmission to the server 20.

The receiver 104 receives, from the server 20, messages transmitted from multiple user terminals 10 to the server 20, a document attached to each message, or other information.

Figure 5:
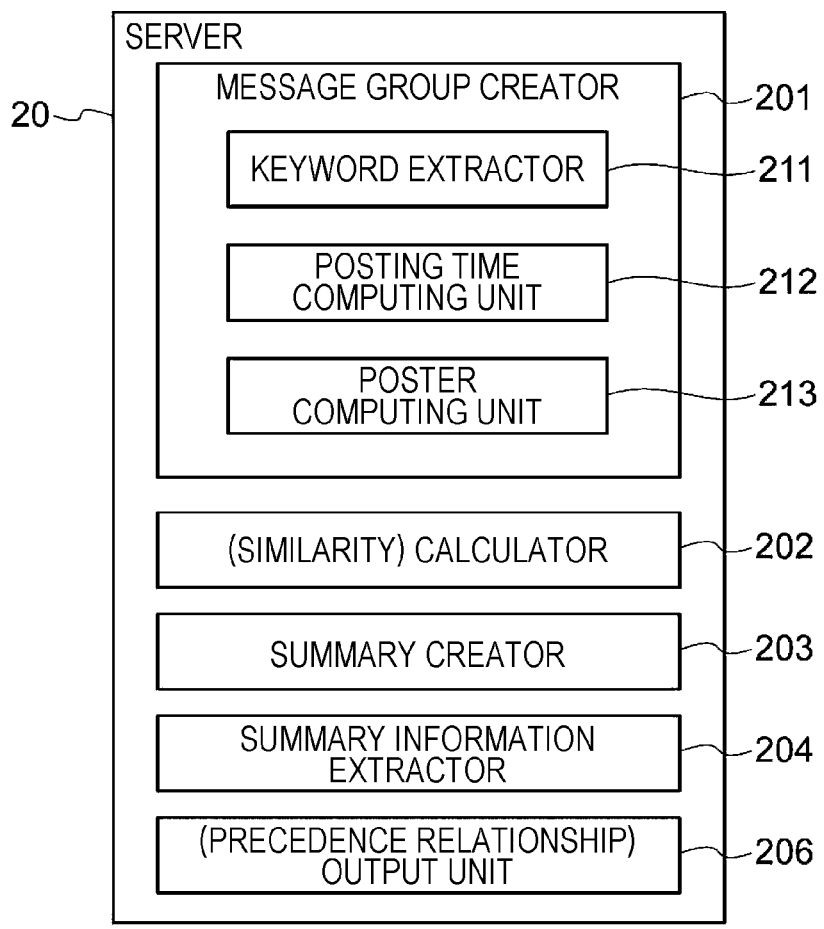
FIG. 5 is a block diagram illustrating an exemplary functional configuration of the server.

FIG. 5 is a block diagram illustrating an exemplary functional configuration of the server 20.

As illustrated in FIG. 5, the server 20 includes, as its functional components, a message group creator 201, a calculator (similarity calculator) 202, a summary creator 203, a summary information extractor 204, and an output unit (precedence relationship output unit) 206. Each functional component is implemented by the CPU 21 reading one of the message-group-granularity alteration program, the precedence relationship output program, the similarity calculation program, and the summary information creation program, which are stored in the ROM 22 or the storage 24, loading the read program into the RAM 23, and executing the program.

The message group creator 201 includes a keyword extractor 211, a posting time computing unit 212, and a poster computing unit 213.

The keyword extractor 211 extracts keywords from multiple messages each posted by a respective one of multiple users. The posting time computing unit 212 computes the respective posting times of multiple messages each posted by a respective one of multiple users. The poster computing unit 213 computes the respective posters (users in the exemplary embodiment) of multiple messages each posted by a respective one of multiple users.

The message group creator 201 groups multiple messages into message groups each including messages with similar characteristics, based on the keywords extracted by the keyword extractor 211, the posting times computed by the posting time computing unit 212, and the posters computed by the poster computing unit 213.

Further, when grouping multiple messages into multiple message groups, the message group creator 201 alters, in accordance with a granularity input with the granularity input unit 102 illustrated in FIG. 4, the number of groups into which to classify the multiple messages.

The calculator (similarity calculator) 202 calculates, based on documents each attached to a respective one of messages included in each of multiple message groups, a similarity between the documents. For instance, the calculator 202 calculates a similarity between keywords each extracted from a respective one of documents attached to the corresponding messages.

The summary creator 203 creates summary information for each of multiple message groups obtained by grouping, based on keywords each extracted from a respective one of documents attached to the corresponding messages included in each of multiple message groups, the posting times of messages to which the corresponding documents are attached, and the posters of messages to which the corresponding documents are attached. Alternatively, the summary creator 203 may create summary information for each of multiple message groups obtained by grouping, based on keywords each extracted from a respective one of multiple messages, the posting times of the messages, and the posters of the messages.

The summary information extractor 204 extracts information such as users and keywords included in summary information.

The output unit (precedence relationship output unit) 206 outputs, based on the posting times of messages included in each of multiple message groups created by the message group creator 201, a precedence relationship between the message groups as a process. The posting times of the messages are computed by the posting time computing unit 212.

Further, the output unit 206 outputs a precedence relationship between multiple message groups as a process by use of a similarity calculated by the calculator 202.

Further, the output unit 206 outputs a precedence relationship between multiple message groups as a process by use of summary information created by the summary creator 203. For example, the output unit 206 may output a precedence relationship between multiple message groups as a process based on users and keywords included in summary information that have been extracted by the summary information extractor 204.

The following describes operation of the process extraction apparatus.

Figure 6:
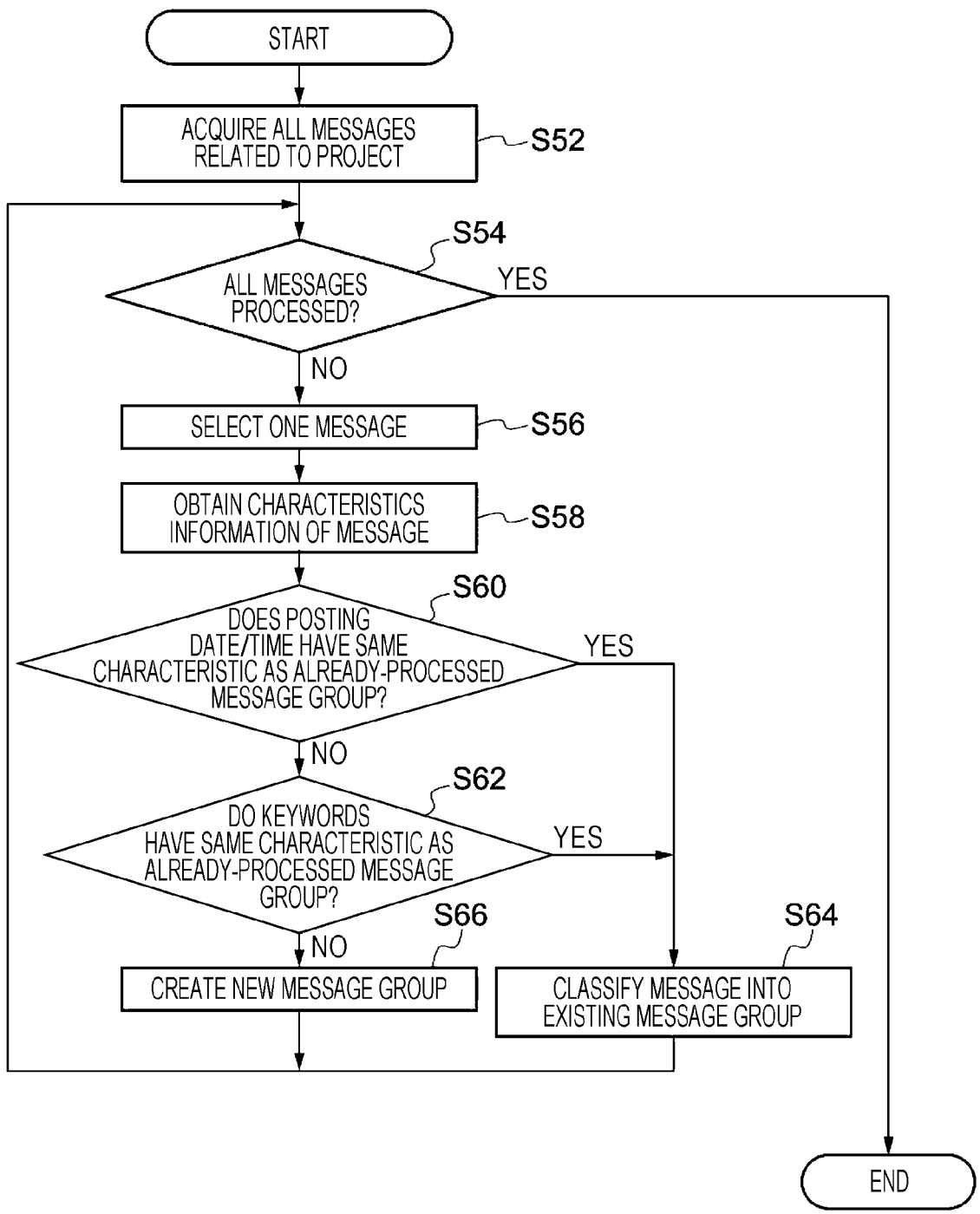
FIG. 6 is a flowchart illustrating, among processes performed by the server, a process of grouping messages into multiple message groups.

FIG. 6 is a flowchart illustrating a message group creation process performed by the server 20 of the process extraction apparatus 1. The message group creation process is performed by the CPU 21 reading the message group creation program from the ROM 22 or the storage 24, loading the program into the RAM 23, and executing the program.

The CPU 21 of the server 20 performs the message group creation process illustrated in FIG. 6 when an instruction to create message groups related to a project is input by a given user.

As illustrated in FIG. 6, the CPU 21 acquires all messages related to a project (step S52). As illustrated in FIG. 8, for example, the display 17 of the user terminal 10 displays the following pieces of information in chronological order: the titles of all project-related messages exchanged by multiple user terminals 10; and the names of documents attached to the messages. As illustrated in FIG. 9A, the CPU 21 acquires all project-related messages (e.g., messages 1 to 9), and users who have posted the respective messages (e.g., users A, B, C, and D).

As illustrated in FIG. 6, the CPU 21 determines whether all of the messages acquired at step S52 have been processed (step S54). Processing of messages in this case specifically refers to steps S56 to S64.

If all the messages have been processed (step S54: YES), the CPU 21 ends the process based on the message group creation program. If not all the messages have been processed (step S54: NO), the CPU 21 selects one message that has not been processed yet (step S56).

The CPU 21 obtains characteristics information of the message selected at step S56 (step S58). Examples of characteristics information of a message include a poster who has posted the message, the posting date/time of the message, and keywords extracted from the message.

The CPU 21 determines whether the posting date/time obtained at step S58 has the same characteristic as an already-processed message group (step S60). For example, the CPU 21 determines that the posting date/time obtained at step S58 has the same characteristic mentioned above if the difference between the obtained posting date/time and the posting date/time of one message included in an already-processed message group is less than or equal to a threshold (e.g., five minutes). The CPU 21 may reference the message's poster when determining whether the obtained posting date/time has the same characteristic mentioned above.

If the obtained date/time has the same characteristic mentioned above (step S60: YES), the CPU 21 proceeds to step S64. If the obtained posting date/time does not have the same characteristic mentioned above (step S60: NO), the CPU 21 determines whether the keywords obtained at step S58 have the same characteristic as an already-processed message group (step S62). For example, the CPU 21 determines that the keywords obtained at step S58 have the same characteristic mentioned above if the number of matches between the obtained keywords and keywords extracted from an already-processed message group is greater than or equal to a threshold (e.g., two).

If the obtained keywords have the same characteristic mentioned above (step S62: YES), the CPU 21 classifies the message selected at step S56 into an existing message group (step S64). If the obtained keywords do not have the same characteristic mentioned above (step S62: NO), the CPU 21 creates a new message group including the message selected at step S56 (step S66).

The CPU 21 then returns to step S54, and if not all the messages have been processed (step S54: NO), the CPU 21 repeats the series of steps S56 to S66 for any unprocessed message.

If all the messages have been processed (step S54: YES), the CPU 21 ends the process based on the message group creation program as described above.

As a result, as illustrated in FIG. 9B, the CPU 21 groups multiple messages into multiple message groups (e.g., G1, G2, G3, and G4) each including messages with similar characteristics.

Figure 7:
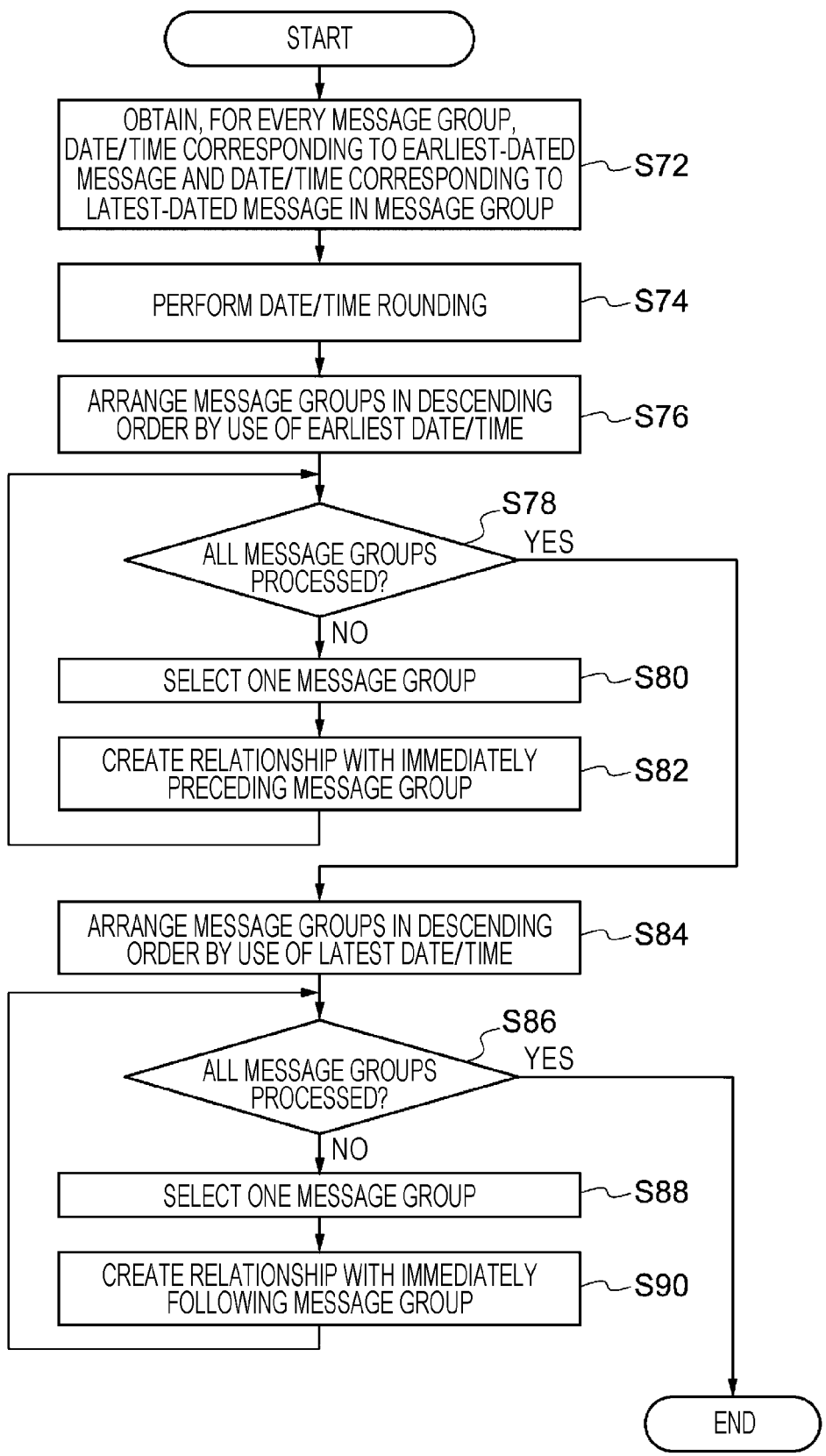
FIG. 7 is a flowchart illustrating, among processes performed by the server, a process of creating a precedence relationship between multiple message groups.

FIG. 7 is a flowchart illustrating a precedence relationship output process performed by the server 20 of the process extraction apparatus 1. The precedence relationship output process is performed by the CPU 21 reading the precedence relationship output program from the ROM 22 or the storage 24, loading the program into the RAM 23, and executing the program. The precedence relationship output process performed by the server 20 is executed after the message group creation process illustrated in FIG. 6.

As illustrated in FIG. 7, the CPU 21 obtains, for every message group, the date/time corresponding to the earliest-dated message and the date/time corresponding to the latest-dated message in the message group (step S72).

The CPU 21 performs date/time rounding (step S74). Examples of date/time rounding include rounding the earliest date/time or latest date/time in each message group to the nearest day or to the first day of the week.

The CPU 21 arranges the message groups in descending order based on the earliest date/time obtained for each message group and rounded at step S74 (step S76).

The CPU 21 determines whether all message groups arranged at step S76 have been processed (step S78).

If all the message groups have been processed (step S78: YES), the CPU 21 proceeds to step S84. If not all the message groups have been processed (step S78: NO), the CPU 21 selects one message group that has not been processed yet (step S80).

The CPU 21 creates a relationship between the message group selected at step S80, and a message group that immediately precedes the selected message group among the message groups arranged in descending order at step S76 (step S82). That is, the CPU 21 establishes a relationship between the two message groups. Consequently, in accordance with a precedence relationship between the earliest-dated messages included in the two respective message groups, a precedence relationship between the two message groups is established.

The CPU 21 then returns to step S78, and if not all the message groups have been processed (step S78: NO), the CPU 21 repeats the series of steps S80 to S82.

If all the message groups have been processed (step S78: YES), the CPU 21 arranges the message groups in descending order based on the latest date/time obtained by for each message group and rounded at step S74 (step S84).

The CPU 21 determines whether all the message groups arranged at step S84 have been processed (step S86).

If all the message groups have been processed (step S86: YES), the CPU 21 ends the process based on the precedence relationship output program. If not all the message groups have been processed (step S86: NO), the CPU 21 selects one message group that has not been processed yet (step S88).

The CPU 21 creates a relationship between the message group selected at step S88, and a message group that immediately follows the selected message group among the message groups arranged in descending order at step S84 (step S90). That is, the CPU 21 establishes a relationship between the two message groups. Consequently, in accordance with a precedence relationship between the latest-dated messages included in the two respective message groups, a precedence relationship between the two message groups is established.

The CPU 21 then returns to step S86, and if not all the message groups have been processed (step S86: NO), the CPU 21 repeats the series of steps S88 to S90.

If all the message groups have been processed (step S86: YES), the CPU 21 ends the process based on the precedence relationship output program.

Through the precedence relationship output process illustrated in FIG. 7, as illustrated in FIG. 9C, the CPU 21 outputs a precedence relationship 300 between multiple message groups (e.g., G1, G2, G3, and G4) as a process. Although not illustrated, information representing the precedence relationship 300 between multiple message groups (e.g., G1, G2, G3, and G4) as a process is transmitted to the user terminal 10 via the communication interface 25 of the server 20, and displayed on the display 17 of the user terminal 10.

Figure 10:
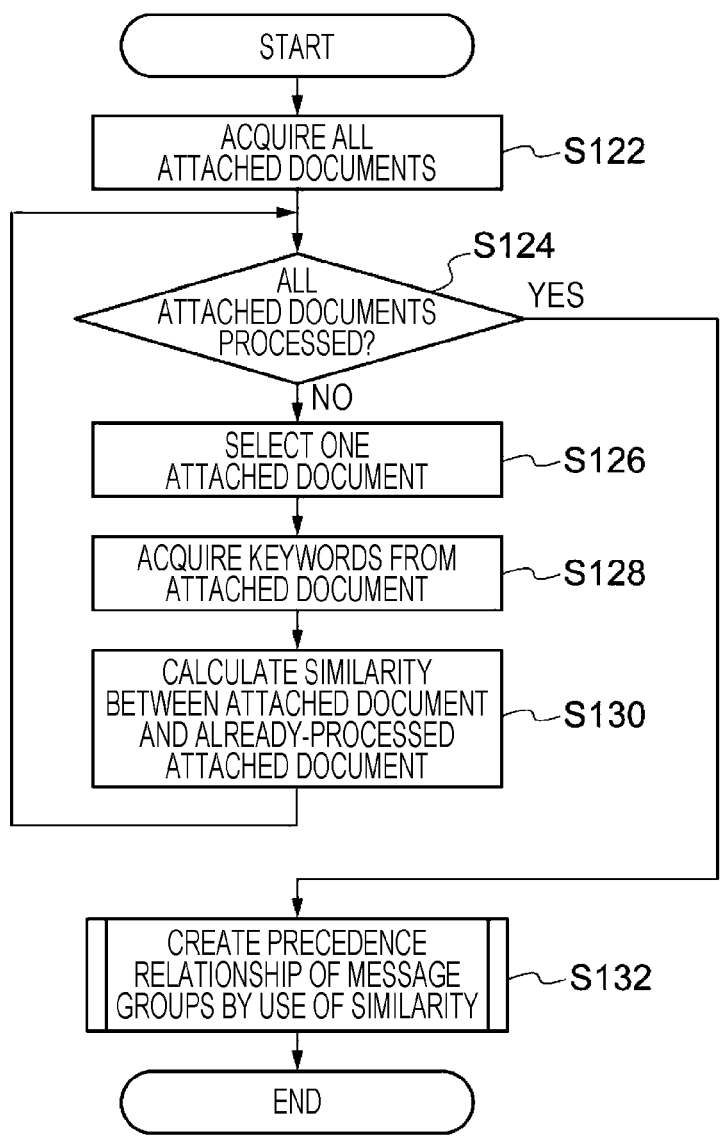
FIG. 10 is a flowchart illustrating, among processes performed by the server, a process of calculating a similarity between attached documents.

FIG. 10 is a flowchart illustrating a similarity calculation process performed by the server 20 of the process extraction apparatus 1. The similarity calculation process is performed by the CPU 21 reading the similarity calculation program from the ROM 22 or the storage 24, loading the program into the RAM 23, and executing the program. The similarity calculation process performed by the server 20 is executed after the message group creation process illustrated in FIG. 6.

Figures 11A, 11B:
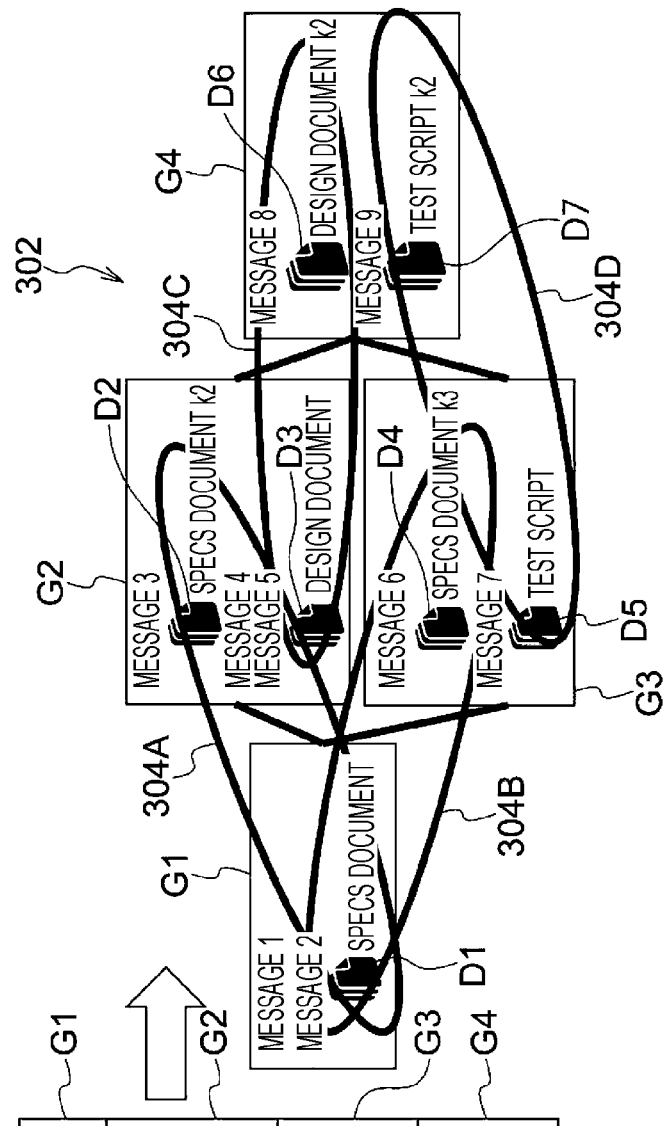
FIG. 11A illustrates exemplary acquisition, at the server, of multiple messages and attached documents.
FIG. 11B illustrates exemplary creation, at the server, of a precedence relationship between message groups based on a similarity between the attached documents.

As illustrated in FIG. 10, the CPU 21 acquires all documents (to be referred to as "attached documents" hereinafter) each attached to a respective one of messages included in multiple message groups (step S122). As a result, as illustrated in FIG. 11A, attached documents (e.g., D1 to D7) each attached to a respective one of messages included in the multiple message groups (e.g., G1, G2, G3, and G4) are acquired.

The CPU 21 determines whether all of the attached documents acquired at S122 have been processed (step S124).

If all the attached documents have been processed (step S124: YES), the CPU 21 proceeds to step S132. If not all the attached documents have been processed (step S124: NO), the CPU 21 selects one attached document that has not been processed yet (step S126).

The CPU 21 acquires keywords extracted from the attached document selected at step S126 (step S128).

The CPU 21 calculates a similarity between the attached document selected at step S126 and an already-processed attached document by use of the keywords selected at step S128 (step S130). The CPU 21 calculates this similarity based on the degree of match between the keywords acquired at step S128, and keywords extracted from an already-processed attached document. For example, if the number of matches between the keywords acquired at step S128, and keywords extracted from an already-processed attached document is greater than or equal to a threshold (e.g., two), the CPU 21 determines these attached documents to have a "high similarity", and if the number of matches is less than a threshold (e.g., two), the CPU 21 determines these attached documents to have a "low similarity".

The CPU 21 then returns to step S124, and if not all the attached documents have been processed (step S124: NO), the CPU 21 repeats the series of steps S126 to S130.

If all the attached documents have been processed (step S124: YES), the CPU 21 creates a precedence relationship S124 (step S132). The process of creating a precedence relationship of message groups is performed based on the procedure of the precedence relationship output process illustrated in FIG. 7. At step S82 illustrated in FIG. 7, the CPU 21 creates a precedence relationship between a message group and a message group immediately preceding the message group by use of the similarity calculated at step S130. Further, at step S90 illustrated in FIG. 7, the CPU 21 creates a precedence relationship between a message group and a message group immediately following the message group by use of the similarity calculated at step S130. The process based on the similarity calculation program is thus ended.

As illustrated in FIG. 11B, the CPU 21 outputs a precedence relationship 302 between multiple message groups (e.g., G1, G2, G3, and G4) as a process, by use of a similarity between attached documents (e.g., 304A, 304B, 304C, and 304D). Each two attached documents determined to have a "high similarity" to each other are shown encircled in FIG. 11B.

Figure 12:
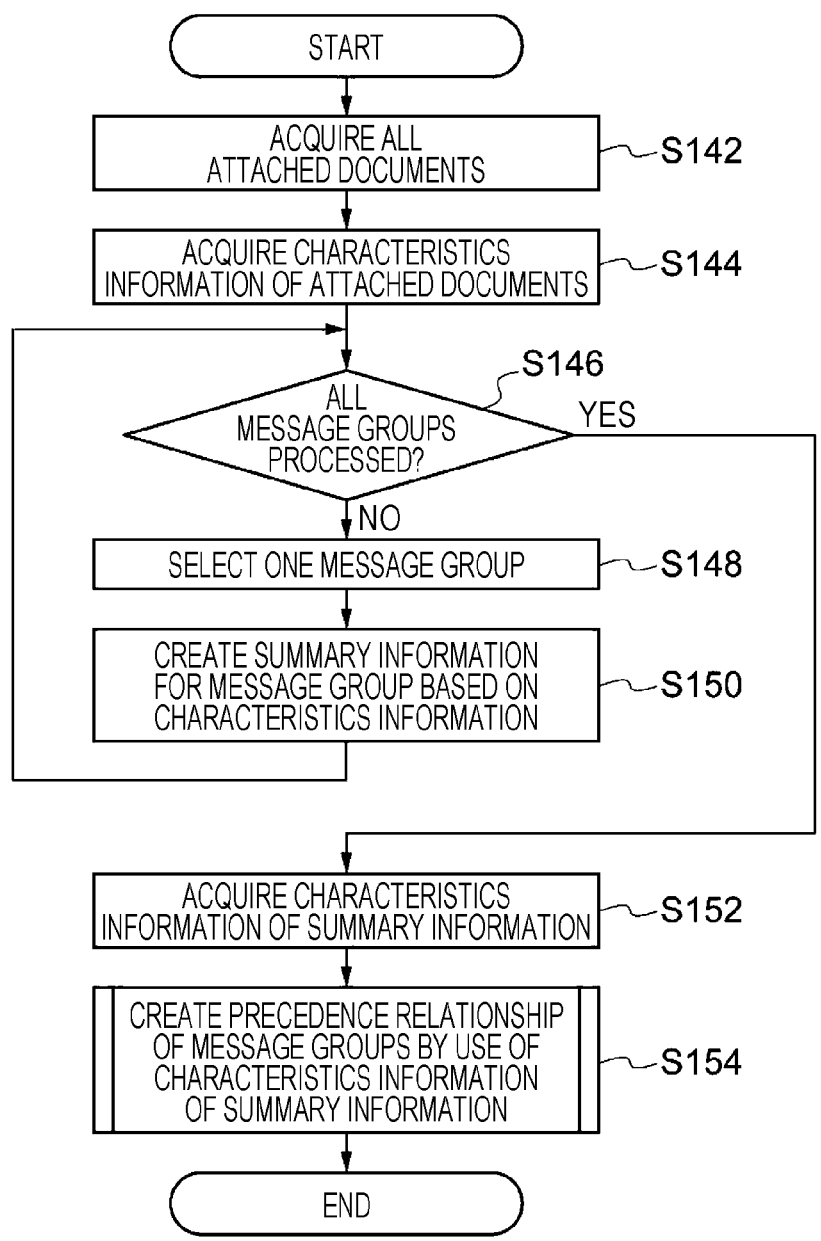
FIG. 12 is a flowchart illustrating, among processes performed by the server, a process of creating summary information for a message group.

FIG. 12 is a flowchart illustrating a summary information creation process performed by the server 20 of the process extraction apparatus 1. The summary information creation process is performed by the CPU 21 reading the summary information creation program from the ROM 22 or the storage 24, loading the program into the RAM 23, and executing the program. The summary information creation process performed by the server 20 is executed after the message group creation process illustrated in FIG. 6.

As illustrated in FIG. 12, the CPU 21 acquires all attached documents each attached to a respective one of messages included in multiple message groups (step S142).

Figure 13:
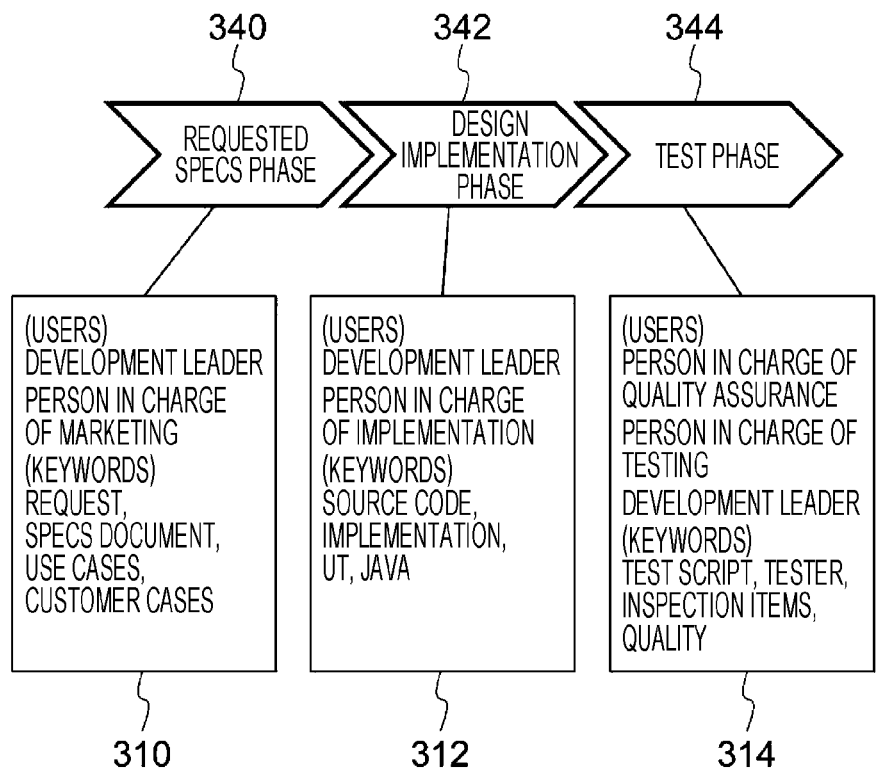
FIG. 13 illustrates exemplary acquisition, at the server, of users of multiple messages, keywords extracted from the messages, and keywords extracted from attached documents.

The CPU 21 obtains characteristics information of the attached documents acquired at step S142 (step S144). Examples of characteristics information include the posters of the corresponding messages to which the attached documents are attached, the posting dates/times of the corresponding messages to which the attached documents are attached, and keywords extracted from the attached documents. As a result, for example, characteristics information 310, characteristics information 312, and characteristics information 314 of the attached documents are acquired as illustrated in FIG. 13. Further, based on the respective users of the attached documents, and keywords extracted from the attached documents, titles 340, 342, and 344 each related to a process may be given to the corresponding attached documents, and a precedence relationship of the titles 340, 342, and 344 may be output.

The CPU 21 determines whether all the message groups have been processed (step S146).

If all the message groups have been processed (step S146: YES), the CPU 21 proceeds to step S152. If not all the message groups have been processed (step S146: NO), the CPU 21 selects one message group that has not been processed yet (step S148).

Figure 14:
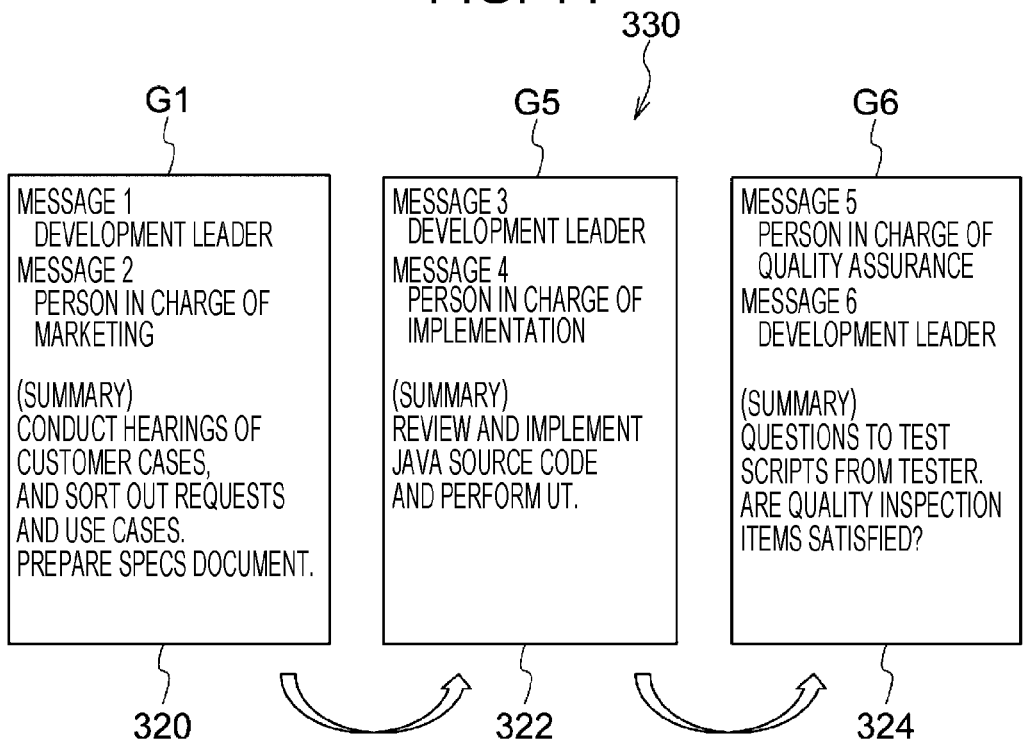
FIG. 14 illustrates exemplary creation, at the server, of summary information for each of multiple message groups.

The CPU 21 creates, based on the characteristics information acquired at step S144, summary information for the message group selected at step S148 (step S150). The creation of summary information is executed by the summary information creation program stored in the ROM 22 or the storage 24 and used to create summary information. As a result, summary information 320, summary information 322, and summary information 324 are created for the corresponding message groups (e.g., G1, G5, and G6) as illustrated in FIG. 14.

The CPU 21 then returns to step S146, and if not all the message groups have been processed (step S146: NO), the CPU 21 repeats the series of steps S148 to S150.

If all the message groups have been processed (step S146: YES), the CPU 21 acquires characteristics information of summary information for every message group (step S152). Examples of characteristics information of summary information include users included in the summary information, and keywords included in the summary information.

The CPU 21 creates a precedence relationship of message groups by use of the characteristics information of summary information acquired at step S152 (step S154). The process of creating a precedence relationship of message groups is performed based on the precedence relationship output process illustrated in FIG. 7. At step S82 illustrated in FIG. 7, the CPU 21 creates a precedence relationship between a message group and a message group immediately preceding the message group by use of the characteristics information of summary information acquired at step S152. At step S90 illustrated in FIG. 7, the CPU 21 creates a precedence relationship between a message group and a message group immediately following the message group by use of the characteristics information of summary information acquired at step S152. The process based on the summary information creation program is thus ended.

As illustrated in FIG. 14, for example, a precedence relationship 330 between multiple message groups (e.g., G1, G5, and G6) as a process is output, based on users included in summary information and keywords included in summary information.

Figure 15A:
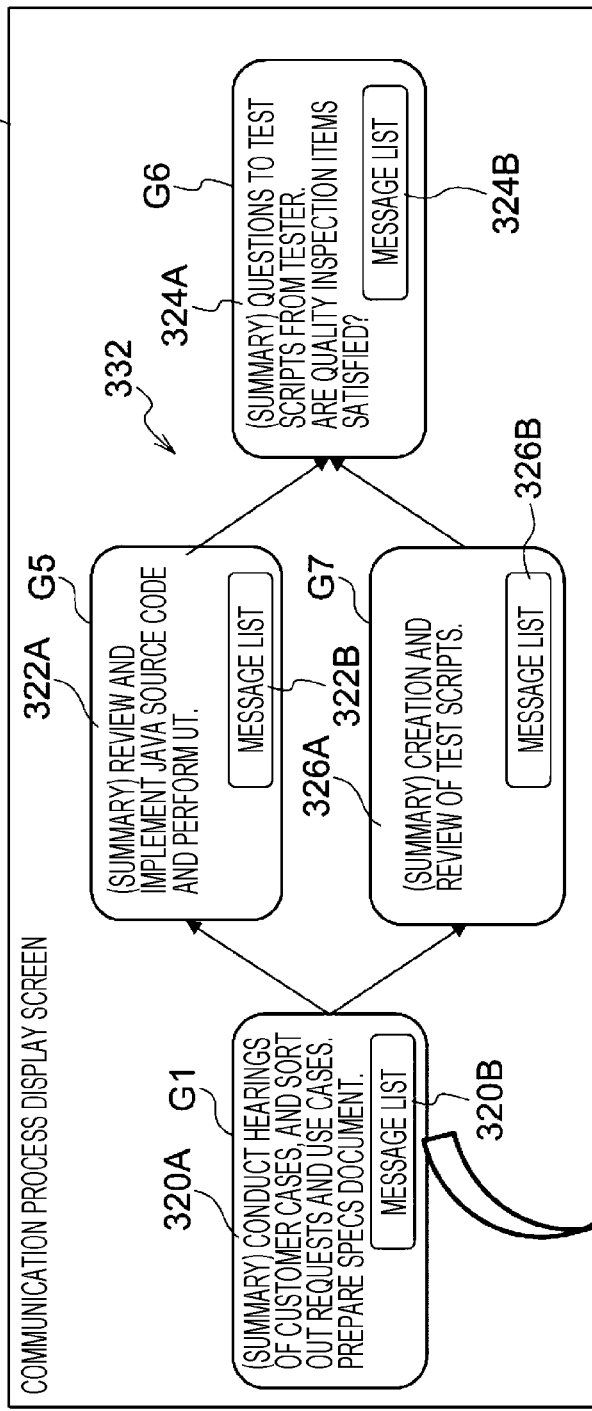
FIG. 15A illustrates an exemplary display of the user terminal on which summary information for each of multiple message groups is displayed.

Information on the precedence relationship 330 between multiple message groups (e.g., G1, G5, and G6) as a process is transmitted to the user terminal 10 via the communication interface 25 of the server 20, and displayed on the display 17 of the user terminal 10. As illustrated in FIG. 15A, at this time, the display 17 of the user terminal 10 displays, for example, summary information (e.g., 320A, 322A, 324A, and 326A) for the corresponding message groups (e.g., G1, G5, G6, and G7), and a precedence relationship 332 between the multiple message groups (e.g., G1, G5, G6, and G7) as a process. For the multiple message groups (e.g., G1, G5, G6, and G7), the corresponding Message List buttons (e.g., 320B, 322B, 324B, and 326B) are displayed.

Figure 15C:
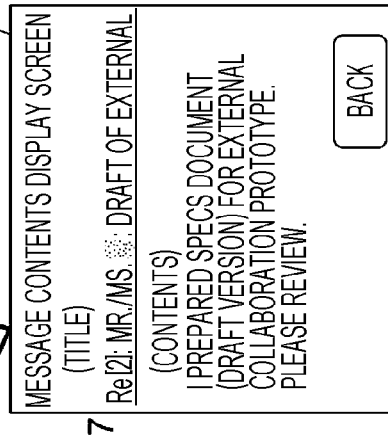
FIG. 15C illustrates an exemplary display of the user terminal on which the contents of a selected message are displayed.
Figure 15B:
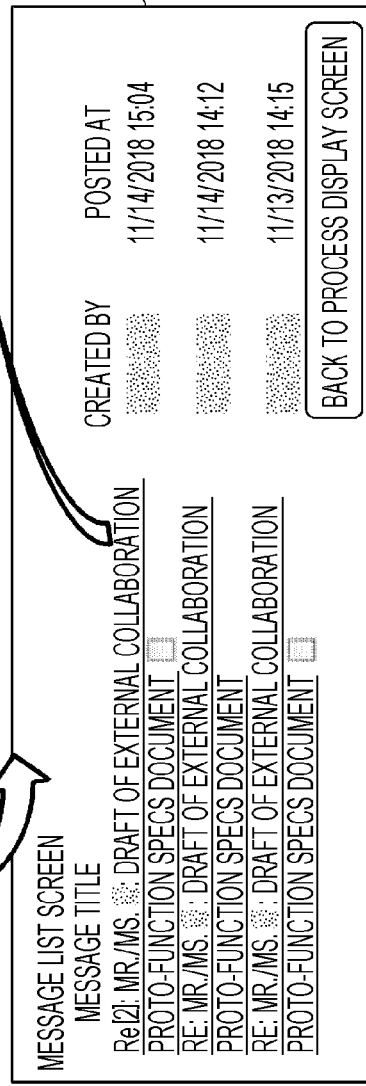
FIG. 15B illustrates an exemplary display of the user terminal on which multiple messages included in a selected message group are displayed.

As illustrated in FIG. 15B, upon selecting one of the Message List buttons (e.g., 320B, 322B, 324B, and 326B), message titles are displayed in list form on the display 17. Further, as illustrated in FIG. 15C, upon selecting one of the message titles, the contents of a message corresponding to the selected message title are displayed on the display 17.

The following describes a message-group-granularity alteration process performed by the server 20 of the process extraction apparatus 1. The message-group-granularity alteration process is performed by the CPU 21 reading the message-group-granularity alteration program from the ROM 22 or the storage 24, loading the program into the RAM 23, and executing the program.

Figure 17:
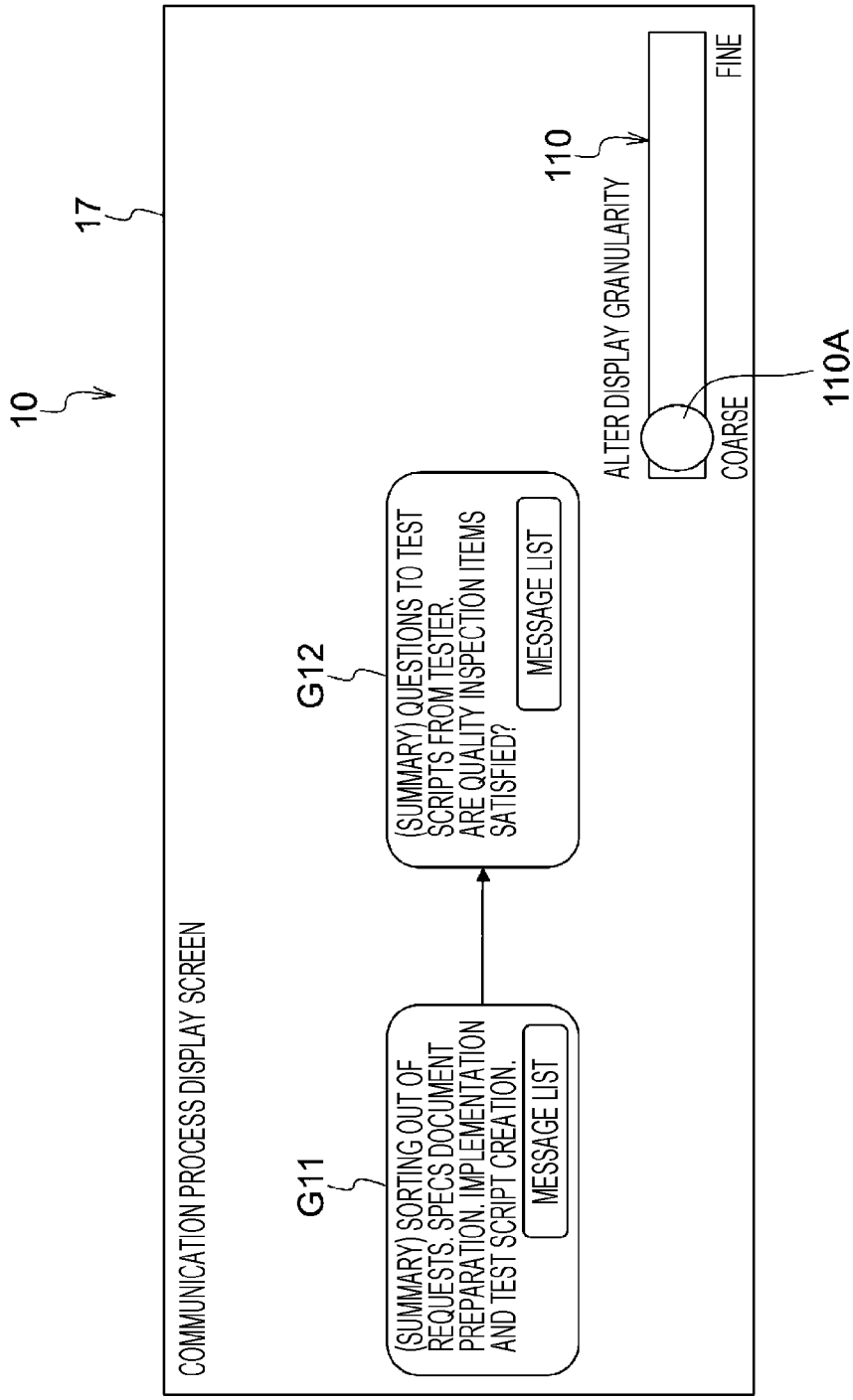
FIG. 17 illustrates an exemplary display of the user terminal, the display displaying summary information for each of multiple message groups shown when the granularity of message groups is at coarse level.

As illustrated in FIG. 17, the granularity alteration input bar 110 is displayed on the display 17 of the user terminal 10. The granularity alteration input bar 110 shows an input button 110A. Alteration information for altering message group granularity is input by moving the input button 110A between finer and coarser levels on the granularity alteration input bar 110.

Figure 16:
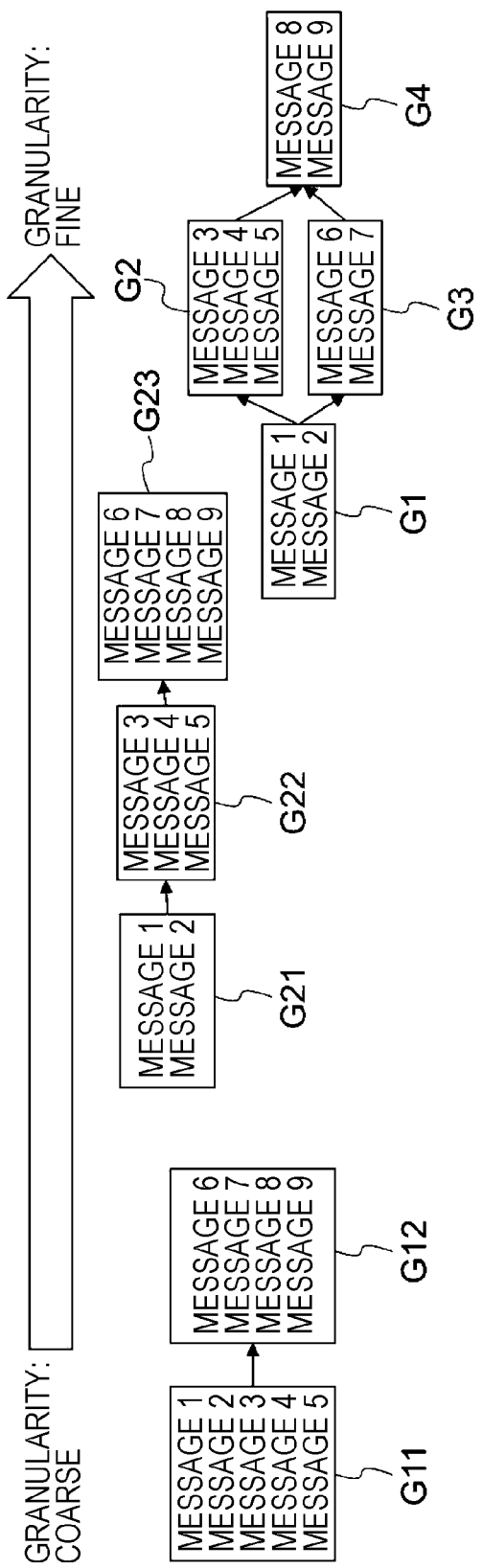
FIG. 16 illustrates exemplary grouping, at the server, of messages into multiple message groups, with the number of groups altered as the granularity of message groups input with a granularity input unit is increased.

When alteration information for altering message group granularity is input by use of the granularity alteration input bar 110, a message-group-granularity alteration process is executed by the server 20. As illustrated in FIG. 16, the CPU 21 of the server 20 groups multiple messages into multiple message groups such that, as the granularity is altered stepwise from coarser to finer levels by use of the granularity alteration input bar 110, the number of groups into which to classify the multiple messages is altered so as to increase stepwise. For instance, at coarse level of granularity, the messages are grouped into two message groups G11 and G12. At medium level of granularity, the messages are grouped into three message groups G21, G22, and G23. At fine level of granularity, the messages are grouped into four message groups G1, G2, G3, and G4.

Figure 18:
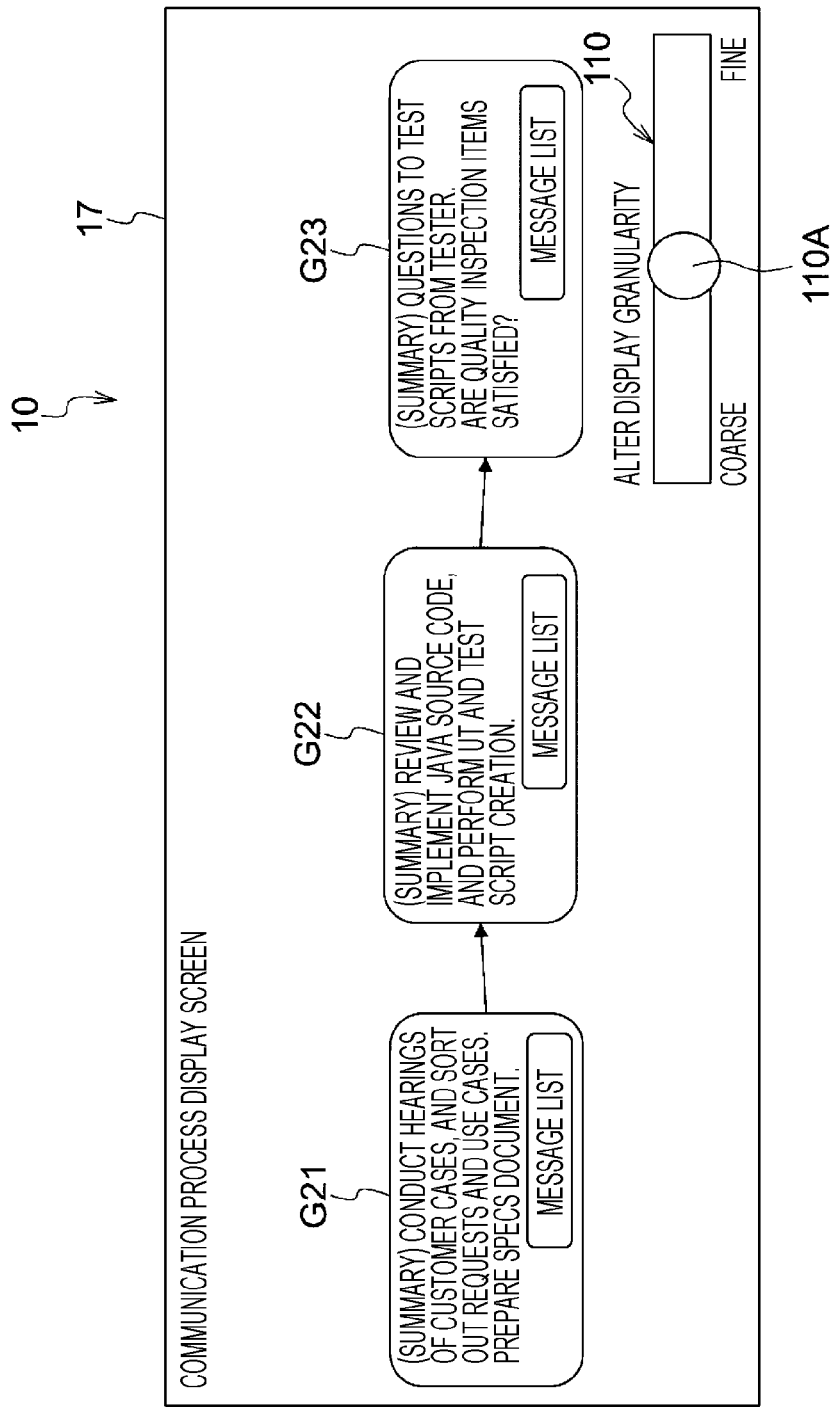
FIG. 18 illustrates an exemplary display of the user terminal, the display displaying summary information for each of multiple message groups shown when the granularity of message groups is altered to medium level.
Figure 19:
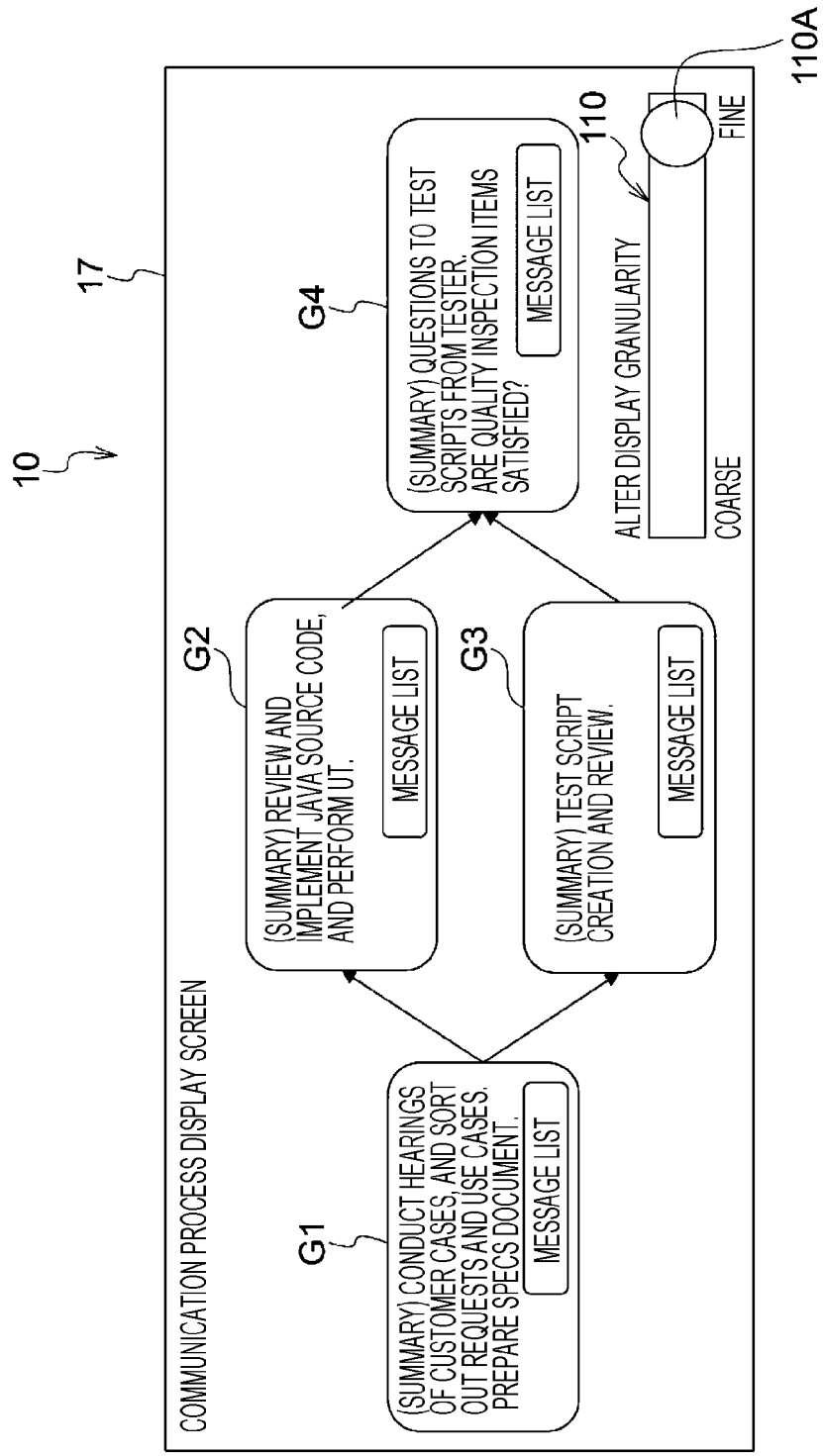
FIG. 19 illustrates an exemplary display of the user terminal, the display displaying summary information for each of multiple message groups shown when the granularity of message groups is altered to fine level.

As illustrated in FIG. 17, at coarse level of granularity, the display 17 of the user terminal 10 displays summary information and a Message List button for each of two message groups G11 and G12. As illustrated in FIG. 18, at medium level of granularity, the display 17 of the user terminal 10 displays summary information and a Message List button for each of three message groups G21, G22, and G23. As illustrated in FIG. 19, at fine level of granularity, the display 17 of the user terminal 10 displays summary information and a Message List button for each of four message groups G1, G2, G3, and G4.

The following describes a process of adjusting the granularity of message groups to identify a problem in a process.

As illustrated in FIG. 20A, if the granularity of message groups is coarse, messages are grouped into two message groups G11 and G12. As the granularity is increased by use of the granularity alteration input bar 110, the messages are grouped into three message groups G31, G32, and G33 as illustrated in FIG. 20B. As the granularity is further increased by use of the granularity alteration input bar 110, the messages are grouped into five message groups G41, G42, G43, G44, and G45 as illustrated in FIG. 20C. The user then checks the respective contents of the message groups G41, G42, G43, G44, and G45, and thus identifies that a problem has occurred specifically in a task corresponding to the message group G43, that is, among tasks in the Design Phase, a Design Document Review task for Web UI Components.

The above-mentioned processes performed by the user terminal 10 and the server 20 can alternatively be implemented by means of dedicated hardware circuitry. In this case, each such process may be executed by a single piece of hardware or may be executed by multiple pieces of hardware.

A program for operating the user terminal 10 or the server 20 may be provided by means of a computer readable storage medium such as a universal serial bus (USB) memory, a flexible disk, or a compact disc read only memory (CD-ROM), or may be provided online via the Internet or other networks. In such a case, the program stored in the computer readable storage medium is normally transferred to a memory, a storage, or other such medium for storage therein. The program may be provided as a single independent piece of application software, or may be incorporated into the software of the user terminal 10 or the server 20 as a function of the user terminal 10 or the server 20.

In the summary information creation process according to the exemplary embodiment, summary information for each of multiple message groups obtained by grouping is created from keywords each extracted from a respective one of attached documents attached to messages, the posting times of messages to which the corresponding attached documents are attached, and the posters of messages to which the corresponding attached documents are attached. However, the present disclosure is not limited to this arrangement. For example, summary information for each of multiple message groups obtained by grouping may be created from keywords each extracted from a respective one of multiple messages, the posting times of the messages, and the posters of the messages.

Although the present disclosure has been described above in detail with respect to a specific exemplary embodiment, the present disclosure is not limited to the exemplary embodiment disclosed, and various other exemplary embodiments will become apparent to those skilled in the art without departing from the scope of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A process extraction apparatus comprising:
    a message group creator that, based on keywords each extracted from a respective one of a plurality of messages posted, respective posting times of the plurality of messages, and respective posters of the plurality of messages, groups the plurality of messages into a plurality of message groups each including messages with similar characteristics;
    an output unit that, based on respective posting times of the messages included in each of the plurality of message groups, outputs a precedence relationship between the plurality of message groups; and
    a calculator that, based on documents each attached to a respective one of the messages included in each of the plurality of message groups, calculates a similarity between the documents,
    wherein the output unit outputs the precedence relationship by use of the similarity calculated by the calculator.

2. The process extraction apparatus according to claim 1,
    wherein the calculator calculates a similarity between keywords each extracted from a respective one of the documents.

3. The process extraction apparatus according to claim 2, further comprising
    a summary creator that, based on the keywords each extracted from a respective one of the documents, the posting times, and the posters, creates summary information for each of the plurality of message groups obtained by grouping,
    wherein the output unit outputs the precedence relationship by use of the summary information.

4. The process extraction apparatus according to claim 3,
    wherein the output unit outputs the precedence relationship, based on users included in the summary information and the keywords included in the summary information.

5. The process extraction apparatus according to claim 4, further comprising
    an input unit that is used to alter a granularity of the plurality of message groups into which to group the plurality of messages,
    wherein when grouping the plurality of messages into the plurality of message groups, the message group creator alters, in accordance with the granularity input with the input unit, a number of groups into which to classify the plurality of messages.

6. The process extraction apparatus according to claim 2, further comprising
    an input unit that is used to alter a granularity of the plurality of message groups into which to group the plurality of messages,
    wherein when grouping the plurality of messages into the plurality of message groups, the message group creator alters, in accordance with the granularity input with the input unit, a number of groups into which to classify the plurality of messages.

7. The process extraction apparatus according to claim 3, further comprising
    an input unit that is used to alter a granularity of the plurality of message groups into which to group the plurality of messages,
    wherein when grouping the plurality of messages into the plurality of message groups, the message group creator alters, in accordance with the granularity input with the input unit, a number of groups into which to classify the plurality of messages.

8. The process extraction apparatus according to claim 1, further comprising
a summary creator that, based on the keywords each extracted from a respective one of the plurality of messages, the posting times, and the posters, creates summary information for each of the plurality of message groups obtained by grouping,
wherein the output unit outputs the precedence relationship by use of the summary information.

9. The process extraction apparatus according to claim 8, wherein the output unit outputs the precedence relationship, based on users included in the summary information and the keywords included in the summary information.

10. The process extraction apparatus according to claim 9, further comprising
an input unit that is used to alter a granularity of the plurality of message groups into which to group the plurality of messages,
wherein when grouping the plurality of messages into the plurality of message groups, the message group creator alters, in accordance with the granularity input with the input unit, a number of groups into which to classify the plurality of messages.

11. The process extraction apparatus according to claim 8, further comprising
an input unit that is used to alter a granularity of the plurality of message groups into which to group the plurality of messages,
wherein when grouping the plurality of messages into the plurality of message groups, the message group creator alters, in accordance with the granularity input with the input unit, a number of groups into which to classify the plurality of messages.

12. The process extraction apparatus according to claim 1, further comprising
a summary creator that, based on the keywords each extracted from a respective one of the plurality of messages, the posting times, and the posters, creates summary information for each of the plurality of message groups obtained by grouping,
wherein the output unit outputs the precedence relationship by use of the summary information.

13. The process extraction apparatus according to claim 12,
wherein the output unit outputs the precedence relationship, based on users included in the summary information and the keywords included in the summary information.

14. The process extraction apparatus according to claim 13, further comprising
an input unit that is used to alter a granularity of the plurality of message groups into which to group the plurality of messages,
wherein when grouping the plurality of messages into the plurality of message groups, the message group creator alters, in accordance with the granularity input with the input unit, a number of groups into which to classify the plurality of messages.

15. The process extraction apparatus according to claim 12, further comprising
an input unit that is used to alter a granularity of the plurality of message groups into which to group the plurality of messages,
wherein when grouping the plurality of messages into the plurality of message groups, the message group creator alters, in accordance with the granularity input with the input unit, a number of groups into which to classify the plurality of messages.

16. The process extraction apparatus according to claim 1, further comprising
an input unit that is used to alter a granularity of the plurality of message groups into which to group the plurality of messages,
wherein when grouping the plurality of messages into the plurality of message groups, the message group creator alters, in accordance with the granularity input with the input unit, a number of groups into which to classify the plurality of messages.

17. The process extraction apparatus according to claim 1, further comprising
an input unit that is used to alter a granularity of the plurality of message groups into which to group the plurality of messages,
wherein when grouping the plurality of messages into the plurality of message groups, the message group creator alters, in accordance with the granularity input with the input unit, a number of groups into which to classify the plurality of messages.

18. A non-transitory computer readable medium storing a program causing a computer to execute a process, the process comprising:
based on keywords each extracted from a respective one of a plurality of messages posted, respective posting times of the plurality of messages, and respective posters of the plurality of messages, grouping the plurality of messages into a plurality of message groups each including messages with similar characteristics;
based on respective posting times of the messages included in each of the plurality of message groups, outputting a precedence relationship between the plurality of message groups; and
based on documents each attached to a respective one of the messages included in each of the plurality of message groups, calculates a similarity between the documents,
wherein the output unit outputs the precedence relationship by use of the similarity calculated by the calculator.

* * * * *